United States Patent [19]
Ho

[11] Patent Number: 5,436,437
[45] Date of Patent: Jul. 25, 1995

[54] AUTOVEHICLE CHECK SYSTEM SPRAYING PAINT ON VEHICLE TO INDICATE A CRIMINALLY INVOLVED VEHICLE

[75] Inventor: Tak S. Ho, Seoul, Rep. of Korea

[73] Assignee: Ilgin Corporation, Seoul, Rep. of Korea; a part interest

[21] Appl. No.: 910,120

[22] PCT Filed: Dec. 29, 1990

[86] PCT No.: PCT/KR90/00024
§ 371 Date: Aug. 28, 1993
§ 102(e) Date: Aug. 28, 1993

[87] PCT Pub. No.: WO91/10213
PCT Pub. Date: Jul. 11, 1991

[30] Foreign Application Priority Data
Dec. 29, 1989 [KR] Rep. of Korea .............. 89-20268

[51] Int. Cl.⁶ .................................................. G06K 7/10
[52] U.S. Cl. .................................................. 235/384
[58] Field of Search .................. 235/384, 462, 454

[56] References Cited
U.S. PATENT DOCUMENTS

| | | | |
|---|---|---|---|
| 4,028,537 | 6/1977 | Snow | 235/472 |
| 4,070,584 | 1/1978 | Chartraire et al. | 235/454 |
| 4,180,204 | 12/1979 | Koenig et al. | 235/472 |
| 4,368,979 | 1/1983 | Ruell | 250/271 |
| 4,480,177 | 10/1984 | Allen | 235/468 |
| 4,535,204 | 8/1985 | Hughes et al. | 235/472 |
| 4,555,618 | 11/1985 | Riskin | 235/384 |
| 4,770,389 | 9/1988 | Danfouth et al. | 250/271 |
| 4,958,064 | 9/1990 | Kirkpatrick | 235/384 |

FOREIGN PATENT DOCUMENTS 182791  7/1988  Japan .................... 235/384

Primary Examiner—John Shepperd
Attorney, Agent, or Firm—Irving Keschner

[57] ABSTRACT

An autovehicle check system which marks vehicles involved in criminallity to be marked with a spray of paint is disclosed. The system uses a matrix code consisting of stacked bar codes having a data bar code two parity bar codes to detect errors and two reference bar codes that are on the edges of the matrix which allows compensation for vehicle movement. Both the bar code and the paint can be either visible or invisible. The system could also be used to collect tolls.

6 Claims, 4 Drawing Sheets

A

B

C
a ▯▯▯▯▯▯▯▯▯ ← REFERENCE CODE
b ▯▯▯▯▯▯▯▯▯ ← DATA CODE
c ▯▯▯▯▯▯▯▯▯ ← PARITY CODE 1
d ▯▯▯▯▯▯▯▯▯ ← PARITY CODE 2
e ▯▯▯▯▯▯▯▯▯ ← REFERENCE CODE

D
a ▯▯▯▯▯▯▯▯▯ ← REFERENCE CODE
b ▯▯▯▯▯▯▯▯▯ ← DATA CODE
c ▯▯▯▯▯▯▯▯▯ ← PARITY CODE 1
d ▯▯▯▯▯▯▯▯▯ ← PARITY CODE 2
e ▯▯▯▯▯▯▯▯▯ ← REFERENCE CODE

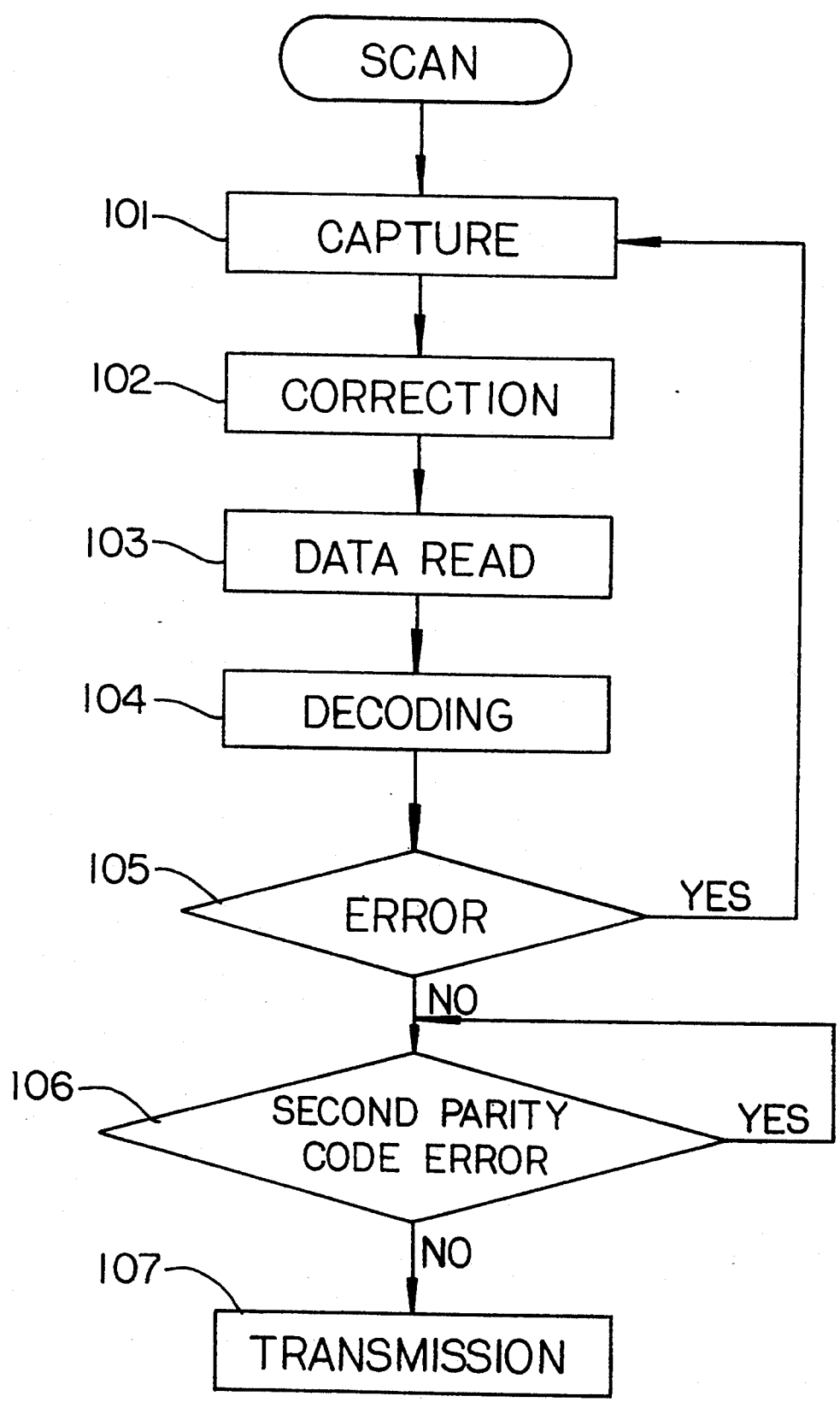

AUTOVEHICLE CHECK SYSTEM SPRAYING PAINT ON VEHICLE TO INDICATE A CRIMINALLY INVOLVED VEHICLE

TECHNICAL FIELD

The invention is to provides an autovehicle check or identification system, and particularly an autovehicle check system using a bar code which enables the automobile to be identified while in either a static or moving condition.

BACKGROUND ART

A bar code has usually been used in one of two ways, one way uses an ink visible to the naked eye and the other way uses an ink invisible to the naked eye. Due to the inherent properties of visible paints, it can be duplicated by a copier and a desk top publishing program to make bar codes for any item. Bar codes have been adapted to the sale and inventory adjustment of articles, but have not been used in the social security system because of the possibility of forgery. The invisible ink bar codes can be adapted to the law enforcement system if the ink is an ultraviolet ray ink or a commercial specific ink.

In light of these points, it is noted that the invisible ink can be of specific benefit to the law enforcement system. For example, if the commercial specific ink is coated on a license plate, the license plate can be seen with a naked eye, but the bar code is identified by only a CCD camera and an invisible bar code identification scanner.

At the present, autovehicles are used in criminal acts, such as robbery and are the objects of theft. It is known that it is advantageous to search for such autovehicles as soon after the commission of the criminal act as possible. That is to say, when a person reports his missing autovehicle to the police, the autovehicle is the object of a search over a large area, city, state or the entire country. At that time, ultimately an autovehicle having a bar code can be identified in a manner where an invisible code identification scanner mounted near the road reads the invisible bar code. Also, the police or other interested parties having a question can use the invisible or visible bar code positioned on a predetermined area of an autovehicle to identify the autovehicle and thus expose the location of the autovehicle. This can lead to the deterrence of criminal acts which require the use of an autovehicle.

Also, the bar code can decrease traffic congestion due to the collection of a toll corresponding to user's destination at the toll station of an expressway. That is, autovehicle identification numbers would be picked up by a bar code identification scanner to make possible the deferred payment of a toll based on the calculation of the traveling distance from the entry point to the destination point or exit of a highway. Furthermore, the printing of a bar code can be configured to represent various information, such as the autovehicle numbers, colors, models and the date of its production. Such information is on file or available in every registration office in the entire country. It is easy to identify an autovehicle which lacks a valid record concerning such information and to determine if the autovehicle identification numbers, colors, etc., changed were to indicate a stolen autovehicle.

At present, the bar code is used within the limited range of goods production, sale, stock-taking and autovehicle production and the management of a warehouse, etc. But, if the bar code is adapted to autovehicles, the method of use a bar code must be changed as well as a system using the communication network of the entire country must be constructed. Also, it is obvious that the system has not been accomplished.

SUMMARY OF THE PRESENT INVENTION

In light of the above points, the invention can innovate regarding the use of an autovehicle, for example the deterrence of criminal acts, the future payment charged to a toll road, the law enforcement of an autovehicle etc..

The main object of the invention is to provide a scanner discriminating a square matrix bar code.

Another object of the invention is to provide an autovehicle check system for tracing and identifying the stolen autovehicle using a bar code.

Another object of the invention is to provide an autovehicle check system for allowing the future payment of a toll charged to the use of a highway.

The present invention comprises bar codes of at least one stripe having various information regarding an autovehicle, a plurality of detecting apparatuses spraying a visible or invisible paint on a suspicuous autovehicle and a plurality of bar code identification scanners discriminating a bar code, the detecting apparatus and the scanner being mounted together or alone at one place, at least one regional slave computers connected to each of the scanners and a central host computer having all the regional slave computers connected thereto.

The visible or invisible bar code has information such as an autovehicle secret number, color and feature and is painted on a license plate or a predetermined exposed place. The detecting apparatus has the data of the autovehicle to be searched and detect the autovehicle. The scanner identifies the bar code of autovehicles to collect information of autovehicles entering into a highway or a trunk road as well as sends autovehicle information to the regional slave computer. The regional slave computer analyzes information received and transmits information of certain preselected autovehicles as well as calculates all data of autovehicles passing through a toll station on a highway or a trunk road. The central host computer classifies information of suspicuous autovehicles and stores classified data at the data base to provide data about a stolen or missing autovehicle to the police, while it receives reports of stolen autovehicles from a plurality of persons subscribing to a telephone station. The central host computer can be provided with an audio teletext or a video teletext.

Also, the invention comprises a square matrix code including one or two data bar codes, at least one parity bar codes and at least two reference bar codes formed at the outmost adjacent to the data bar code and one of parity codes.

For example, it is easy to identify a simple bar code formed as one or two lines where an autovehicle is traveling at a low speed or is stopped. But, the accuracy of the identification for autovehicles running at an irregular speed or direction is inevitably and remarkably reduced. To remedy this, the size of the bar code including length and breadth can be enlarged. The enlarged bar code can then be secured to an autovehicle in order to increase the bar code identification rate. If the bar code is made of a visible paint, the autovehicle is illeffected on its appearance. If the visible bar code is written by a specific paint on the front glass of an autovehicle, it may cause at least partial obstruction of the driving view.

Therefore, when the parity bar code is arranged adjacent to the data bar code, and also reference bar codes having a predetermined length and width are positioned adjacent to the data bar code and parity bar code, respectively, a bar code identification scanner compares actual identification data code and parity bar codes with the reference bar codes with an bar code identification angle being changed during the running of an autovehicle as well as corrects the data and parity bar codes adjacent to each of reference bar codes by the angle difference between the actual code and the identified code and then reads them. The corrected data are stored as the identification data at an inner RAM of the scanner. The parity data are decoded to enable the scanner to judge whether the identification data are in error. Next, if the identification data are in error, the identification data are canceled. If not, the other parity code is checked, once more. If not, only the identification data are transmitted as the actual data to a regional computer or a central computer. Thus, the invention can exactly discriminate at least one bar code secured to a predetermined place on an autovehicle, so that it may effectively manage a highway or a trunk road relative to autovehicles.

BRIEF DESCRIPTION OF DRAWINGS

The invention will be explained in detail by reference to the accompanying drawings, in which:

FIG. 5 is a flow chart illustrating the procedures identifying a bar code according to the present invention.

DETAILED DESCRIPTION OF THE INVENTION

Figure 1:
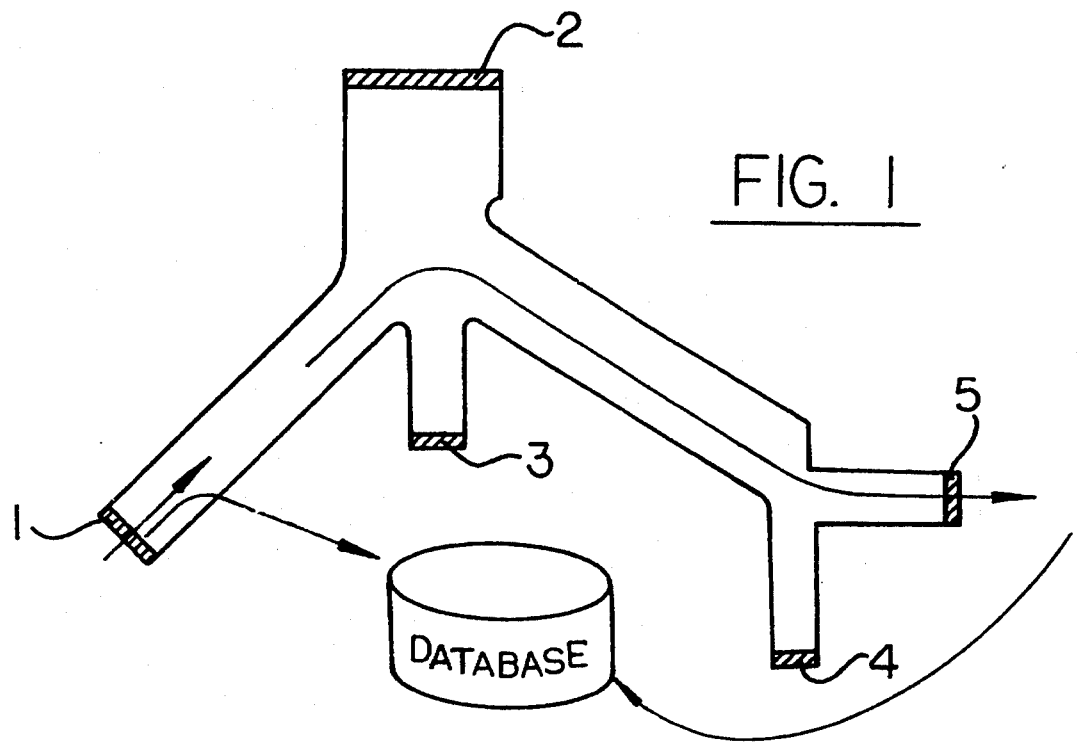
FIG. 1 is a schematically view showing a trunk road with a bar code identification scanner according to the present invention mounted threat.

As illustrated in FIG. 1, all the information associated with an autovehicle entering into highway 2 at an access road 1 of a trunk road or traveling into other trunks road 3 4, or 5 is read at the entry of highway 2 or a trunk road, respectively, and is automatically sent to the data base of a central computer. All such information may be written as a visible code or an invisible code. Thereafter, all information corresponding to autovehicles passing through trunk road 5, as shown in the drawing, is read at its entry sent by a bar code identification scanner. The data is analyzed as well as classified into data for deferred payment of a toll and into data for autovehicles sought by the police. This data is then sent to the data base of a central computer which proceeds with the next steps related to the corresponding autovehicles based on data analyzed.

Figure 2:
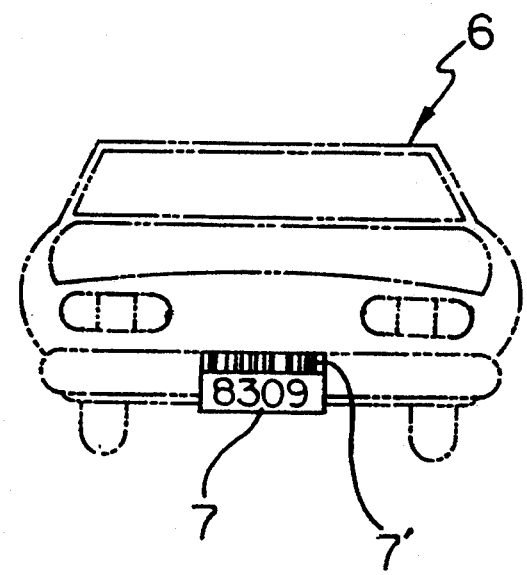
FIG. 2 is a view showing a bar code secured to an autovehicle according to the present invention.

As shown in FIG. 2, the bar code of an invisible or a visible paint and/or ink may be coated on license plate 8. If the paint is visible, this code may be positioned on any part of the vehicle which can be viewed. Bar code 7 can cover all information of the features of particular autovehicle.

Figure 3:
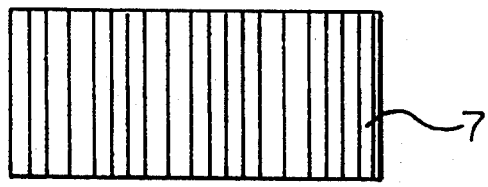
FIGS. 3A, 3B, 3C and 3D illustrate bar codes adapted to an autovehicle according to the present invention.
Figure 3:
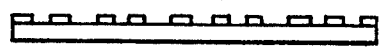

As shown in FIGS. 3A and 3B, bar code 7 is coated on license plate 8 like the bar code of commercial articles, while is in the form of a plurality of stripes 9 having a predetermined height and width.

As shown in FIG. 3C, a square matrix code includes one data code (b) and two parity codes (c), (d) positioned side by side or adjacent to each other, and two reference codes having a predetermined length and width. Reference codes and (e) are arranged it the lower and upper of data code (b) and parity code (d), respectively. The square matrix bar code is identified by a bar code identification scanner with being changed by an identification angle having the angle difference between the actual bar code and the identification bar code as shown in FIG. 3D.

As shown in FIG. 5, a bar code identification scanner recognizes a square matrix code through the operation of the following steps.

A scanner captures from a moving autovehicle a matrix code printed on a predetermined place of autovehicles at step 101, even through the matrix code has an identification angle (FIG. 3D). Next, the scanner compares each of reference codes (a) and (e) with data code (b) and parity codes (c) and (d), and data code (b) and parity codes (c), (d) are corrected by a microprocessor or a control circuit based on an identification angle of a reference of a bar code at step 102 to recognize as a normal matrix code of FIG. 3C. The corrected identification data is stored in RAM of the scanner at step 103. Any one of parity codes (c) and (d) is decoded at step 104. Step 105 determine from the result of decoding of one parity code whether the identification data code is in error. If an identification data code is in error, step 105 returns to step 101 to cancel the error data as well as to capture another matrix code. If the identification data code is correct, step 105 goes on to step 106 to judge according to the result of decoding the other parity code, whether the identification data code is in error. If the identification data code is in error, it is again judged. If not, reference codes (a) and (e) are removed, and only the identification data are sent to a central computer described below in detail. The square matrix code can be adapted to an autovehicle check system as shown in FIG. 4.

Figure 4:
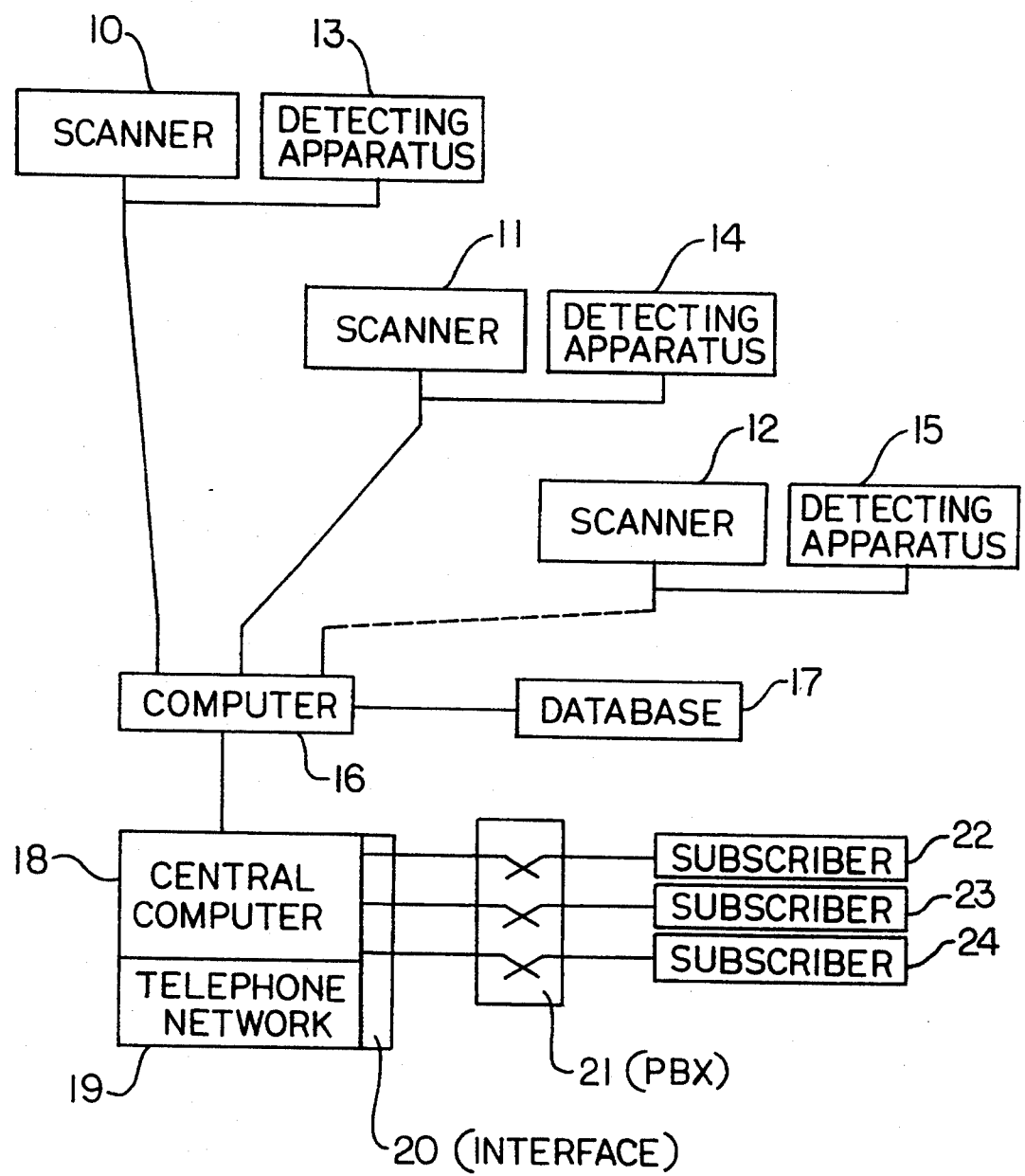
FIG. 4 is a block diagram illustrating an autovehicle check system according to the present invention.

As shown in FIG. 4, the bar code identification CCD camera or bar code identification scanners 10, 11 and 12 are positioned at the entry and exit of each highway or trunk road in the country to read the numbers, colors and secret code related to an autovehicle information. These scanners 10, 11 and 12 each may be provided with detecting apparatuses 13, 14 and 15 mounted adjacent thereto for detecting autovehicles sought by the police. Detecting apparatuses 13, 14 and 15 can recognize autovehicles sought for the involvement of a criminal act. If they identify the involved autovehicle, detecting apparatuses 13, 14 and 15 spray an invisible paint or visible paint on a predetermined place of the autovehicle. The resulting point is exposed to public persons or law enforcement agencies indicating a criminally involved autovehicle. These scanners and detecting apparatuses are connected to the corresponding regional computers, separately or together. Regional computer 16 is provided with a data base for the management of the deferred payment of a toll charged to autovehicles passing through a highway or a trunk road as well as for the transmission of all information concerning autovehicles sought by the police to central computer 18. Central computer 18 is provided with an audio teletext or a video teletext. Also, central computer 18 is provided with telephone communication network system 19 to receive reports of stolen autovehicles from telephone subscriber 22, 23 and 14, etc. through telephone communication network 20. Therefore, central computer 18 collects information with respect to autovehicles sought by the police from regional computer 16 and information from telephone subscribers 23 and 24. This information is analyzed and stored at its data base, and is available to order the arrest and/or capture of stolen autovehicles to the corresponding regional police offices.

As described above, the invention allows the monitoring and discernment of autovehicles traveling on all roads in the entire country. With it, it is easy to manage tolls charged to autovehicles passing through a highway or trunk road as well as to arrest suspicious autovehicles, thereby allowing the prevention of accidents.

Particularly, the square matrix code of the invention allows accurate data reading even though the autovehicle is moving, in the manner that a code identification angle due to the velocity and direction of the autovehicle is corrected by a reference code and a data code and is judged by a parity code as to whether it is correct.

I claim:

1. An autovehicle check system comprising:

a matrix code corresponding to various information about an autovehicles to which it is affixed;

means for scanning said matrix with a scanning beam;

means responsive to the signal returned from said matrix code and discriminating a predetermined matrix code and generating a signal when said predetermined matrix code is detected; and means for spraying a marking medium onto an autovehicle whose matrix code corresponds to said predetermined matrix code.

2. The system of claim 1 further including at least one regional slave computer connected to said scanning and responsive means.

3. The system of claim 2 further including a central computer connected to said regional slave computer, the central computer storing information received from remote sources which corresponds to information regarding the selection of said predetermined matrix code and wherein said central computer supplies information regarding said selected predetermined matrix code to said regional slave computer.

4. The system of claim 1 wherein said marking medium is visible or invisible to a viewer.

5. The autovehicle check system of claim 1 wherein the matrix code includes one data bar code, at least one parity bar code and at least two reference bar codes, the data bar code and parity code positioned between said reference codes.

6. The autovehicle check system of claim 1 wherein the matrix code is made of either an invisible or visible pigment.

* * * * *

UNITED STATES PATENT AND TRADEMARK OFFICE
CERTIFICATE OF CORRECTION

PATENT NO. : 5,436,437

DATED : July 25, 1995

INVENTOR(S) : Tak S. Ho

It is certified that error appears in the above-identified patent and that said Letters Patent is hereby corrected as shown below:

On the title page:
The name of the inventor is corrected from "Tak S. Ho" to -- Seung H. Tak --

Signed and Sealed this

Fourteenth Day of November, 1995

Attest:

BRUCE LEHMAN

Attesting Officer

Commissioner of Patents and Trademarks